US012533779B2

(12) United States Patent
Yoshikane et al.

(10) Patent No.: US 12,533,779 B2
(45) Date of Patent: Jan. 27, 2026

(54) DRIVING TOOLS

(71) Applicant: MAKITA CORPORATION, Anjo (JP)

(72) Inventors: Kiyonobu Yoshikane, Anjo (JP); Tatsuya Ikedo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/949,130

(22) Filed: Nov. 15, 2024

(65) Prior Publication Data

US 2025/0187160 A1 Jun. 12, 2025

(30) Foreign Application Priority Data

Dec. 11, 2023 (JP) ................................ 2023-208612

(51) Int. Cl.
*B25C 1/04* (2006.01)

(52) U.S. Cl.
CPC .................................. *B25C 1/047* (2013.01)

(58) Field of Classification Search
None
See application file for complete search history.

(56) References Cited

U.S. PATENT DOCUMENTS

| | | | | |
|---|---|---|---|---|
| 11,198,211 | B2 | 12/2021 | Umino et al. | |
| 2020/0122308 | A1* | 4/2020 | Bradley | B25C 1/041 |
| 2021/0237242 | A1* | 8/2021 | Carrier | B25C 1/047 |
| 2021/0299835 | A1* | 9/2021 | Ward | B25C 1/06 |
| 2021/0299837 | A1* | 9/2021 | Garces | B25C 1/06 |
| 2022/0371167 | A1* | 11/2022 | Bradley | B25C 7/00 |
| 2023/0278177 | A1* | 9/2023 | Julius | B25C 1/06 227/129 |

FOREIGN PATENT DOCUMENTS

| | | | |
|---|---|---|---|
| JP | 6627990 | B2 | 1/2020 |

* cited by examiner

*Primary Examiner* — Tanzim Imam
(74) *Attorney, Agent, or Firm* — Oliff PLC

(57) ABSTRACT

A driving tool includes a plate-like driver having rack teeth (engaged portions). The lifter engages the rack teeth. The lifter allows the driver to move. A striker is connected to a tip of the driver. The striker strikes the driven member. An area of a striking surface of the striker is larger than an area of the tip of the driver.

20 Claims, 6 Drawing Sheets

DRIVING TOOLS

CROSS-REFERENCE TO RELATED APPLICATIONS

This application claims priority to Japanese patent application serial number 2023-208612 filed Dec. 11, 2023, the contents of which are incorporated herein by reference in their entirety for all purposes.

BACKGROUND

The present disclosure relates to a driving tool for driving driven members such as nails and staples into a wood and other materials.

Conventionally, a gas-spring type driving tool uses a thrust power of compressed air as an impact force. The driving tool has a rectangular plate-like driver elongated in a driving direction. The driver moves in the driving direction by gas pressure to strike the driven member. The driver, which has moved in the driving direction, is returned to a counter-driving direction by a lifter located on a side of the driver. The lifter engages rack teeth formed on the side of the driver and returns the driver to its original position.

The driver strikes a circular flange-like head of the driven member with its rectangular-shaped end face. Therefore, the impact force of the driver is concentrated in one area of the head of the driven member. As a result, there is a concern that the driver may not be able to apply power to the driven member properly. In addition, when a nail is jammed, the head of the driven member may get caught in a gap between the driver and a driver guide. In such a case, there is a concern that the end of the driver may be damaged. To address these concerns, there has conventionally been a need for a driver that can apply impact force over a wide surface conforming to the circular shape of the head of the driven member. However, there is a concern that a round rod-shaped driver may likely be heavier than a rectangular plate-like driver. In addition, it may become more difficult to machine rack teeth on the round rod-shaped driver.

Therefore, there has been a conventional need for a driving tool that can strike driven members in a wide range with a simple structure.

SUMMARY

According to one aspect of the present disclosure, a driving tool includes a plate-like driver having rack teeth. A lifter engages the rack teeth to move the driver. A striker is connected to an end of the driver and configured to strike driven members. An area of a striking surface of the striker is larger than an area of the end of the driver. Therefore, the striker having an area larger than the end of the driver strikes the driven member. Compared to a structure where the end of the driver strikes the driven member, it is easier to strike the driven member in a wider range. It is possible to reduce an increase in weight with a simple structure to connect the striker to the end of the driver.

DETAILED DESCRIPTION

Figure 1:
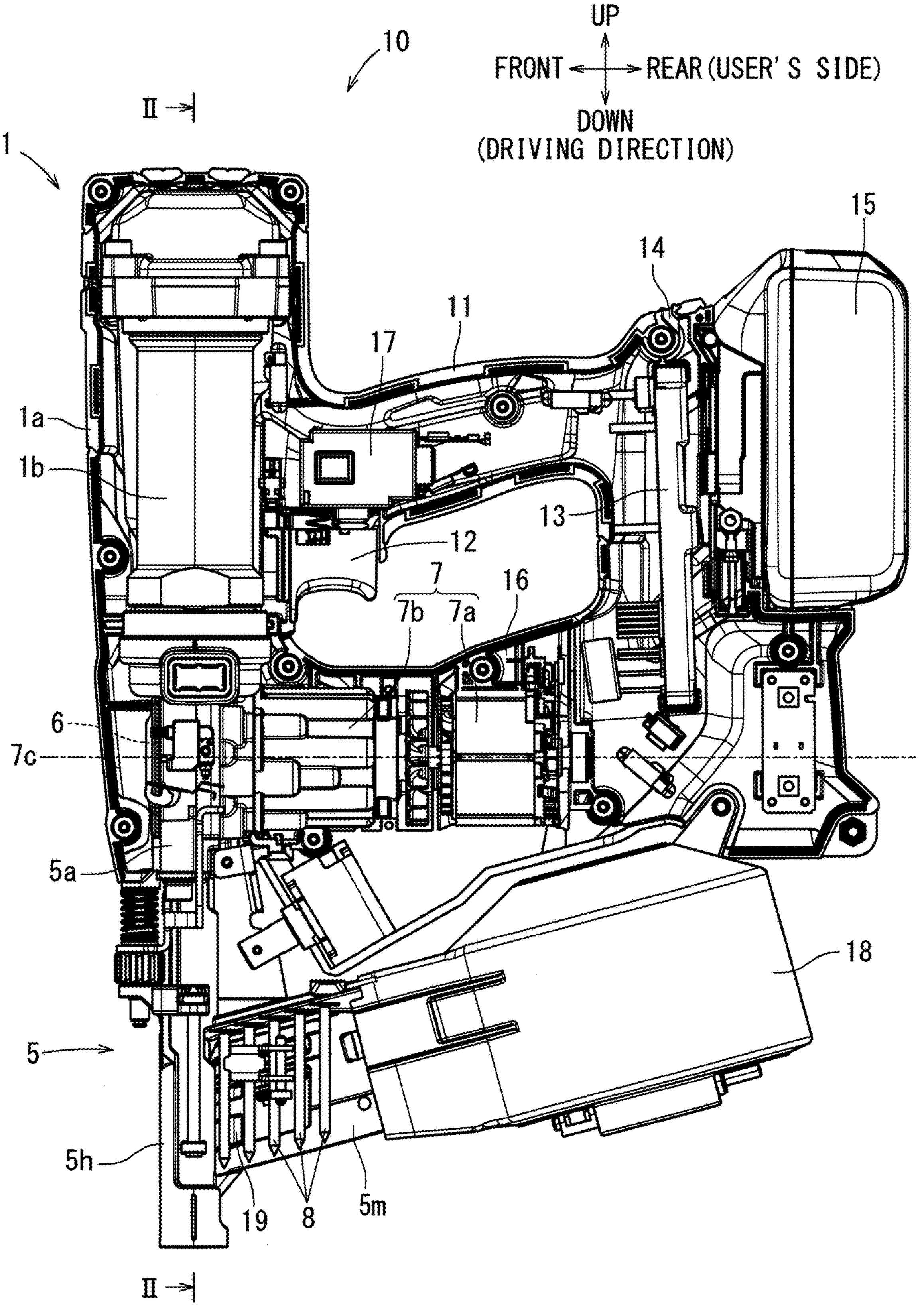
FIG. 1 is a left side view of a driving tool with a left housing removed.

According to another aspect of the present disclosure, the striker is detachably connected to the driver. This allows the striker to be replaced easily.

According to another aspect of the present disclosure, the driven member has a head that is at least partially a circular arc. The striker has a circular arc portion. The striker can thus easily perform striking that is suitable for the head of the driven member.

According to another aspect of the present disclosure, the driving tool includes a magazine configured to accommodate driven members. The striking surface of the striker has a cutoff edge formed by cutting a portion of a circle. The striker is positioned such that the cutoff edge is oriented to the magazine. Typically, the magazine accommodates a plurality of driven members connected in a row. Therefore, with the cutoff edge oriented to the magazine, the striker is less likely to interfere with a driven member arranged after a driven member to be struck.

According to another aspect of the present disclosure, an attachment recess is formed in the striker into which the end of the driver is inserted. Thus, the end of the driver having a relatively small diameter may be assembled into the striker having a relatively large diameter, in a rational and easy-to-assemble manner.

According to another aspect of the present disclosure, the driving tool has a pin that is inserted into the driver and the striker. Thus, the driver and the striker may be connected to each other with a simple structure by inserting a pin.

According to another aspect of the present disclosure, the driving tool has a tubular driver guide to guide the movement of the driver. The driver guide is formed with an outwardly opening attachment hole. The attachment hole allows a pin to be inserted into the driver and the striker. This allows the driver and the striker to be connected to each other with the driver and the striker disposed within the driver guide.

According to another aspect of the present disclosure, the driving tool has a magazine. The magazine accommodates driven members to be supplied to the driver guide. The guiding channel guides the driven members from the magazine to the driving channel. The guiding channel is located on an extension of the attachment hole. Therefore, the pin inserted through the attachment hole can be pushed toward the guiding channel. This allows for easy disconnection between the driver and the striker.

According to another aspect of the present disclosure, the driver guide includes a driver guide portion to guide the movement of the driver and a striker guide portion to guide the movement of the striker. Thus, the driver guide can guide the movement of the striker. This prevents misalignment of the striker when striking the driven member. As a result, the striker can properly strike the driven member.

According to another aspect of the present disclosure, the driver is stopped and held in a standby position by the lifter. The attachment hole is located to allow a pin to be inserted into the driver when the driver is in the standby position. Therefore, the pin may be attached or removed with the driver held in the standby position.

According to another aspect of the present disclosure, the driving tool includes a piston connected to the driver and a cylinder to generate gas pressure by the piston. Therefore, the driver can strike the driven member using the gas pressure.

Hereinafter, one embodiment of the present disclosure will be described with reference to FIGS. 1 to 6. As shown in FIG. 1, a driving tool 10 is a gas-spring type that utilizes, for example, gas pressure to drive driven members. In the following description, a driving direction of the driven member will be referred to as a downward direction and a counter-driving direction will be referred to as an upward direction. A user grasps the driving tool 10 with his/her hand and is positioned on a right side in FIG. 1. The user's front side will be referred to as a rearward direction (user's side) and a rear side will be referred to as a frontward direction. Left-right direction will be determined with reference to a position of the user.

As shown in FIG. 1, the driving tool 10 has a tool body 1. The tool body 1 has a substantially cylindrical housing 1*a*. The housing 1*a* is configured to accommodate a tubular cylinder 1*b* and an upper portion of a nose 5 that is connected to a lower portion of the cylinder 1*b*. A lower portion of the nose 5 protrudes downward from the housing 1*a*.

As shown in FIG. 1, the nose 5 has a metal driver guide 5*a* and a contact arm 5*h* that is attached to a lower portion of the driver guide 5*a*. The contact arm 5*h* is allowed to slide upward and downward relative to the driver guide 5*a*. The contact arm 5*h* is biased by a spring or the like to move downward relative to the driver guide 5*a*. The contact arm 5*h* may move upward when, for example, pressed against a workpiece.

Figure 3:
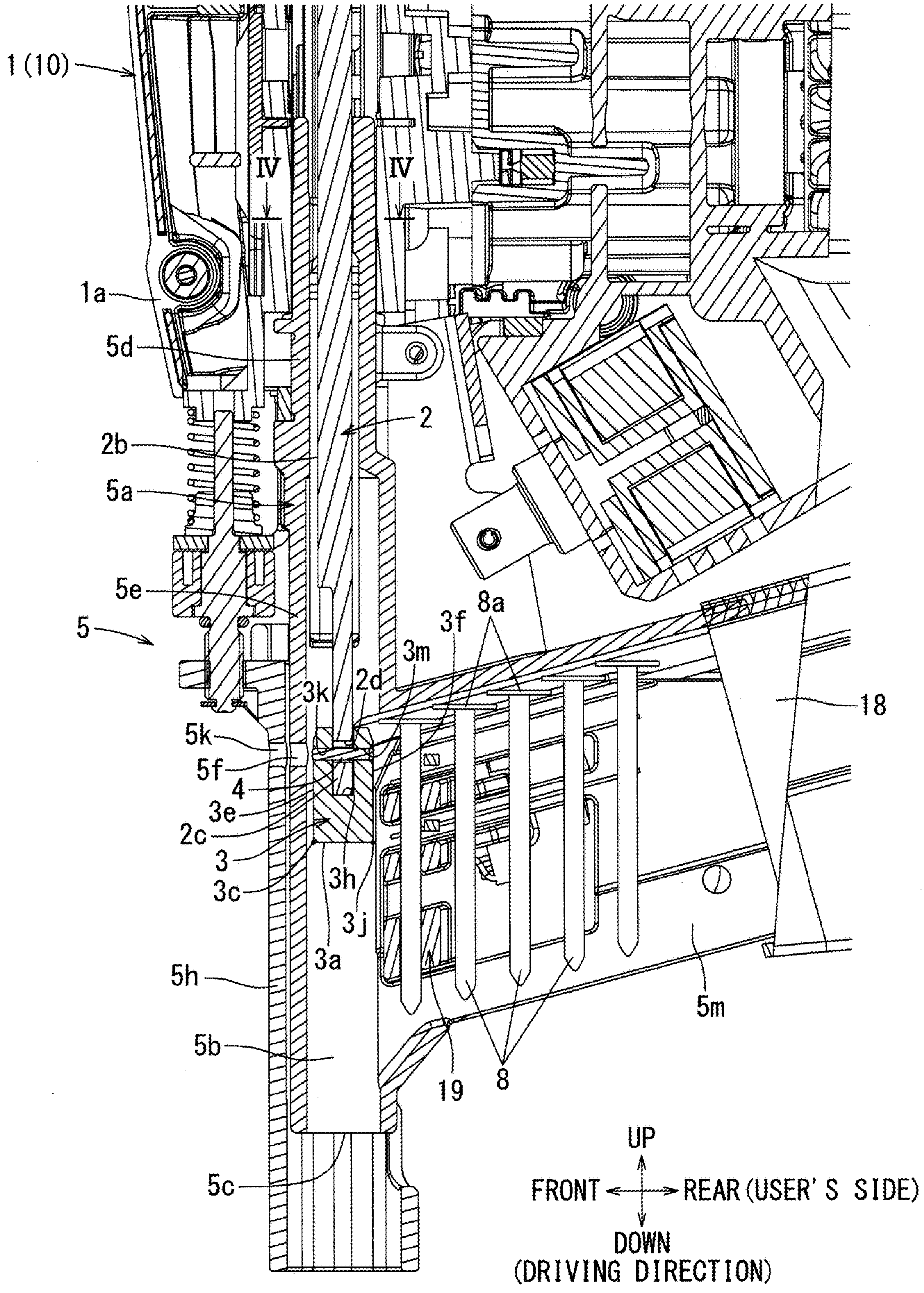
FIG. 3 is an enlarged cross-sectional view of a nose.

As shown in FIG. 3, a driving channel 5*b* is formed inside the driver guide 5*a*. The driver guide 5*a* includes a guiding channel 5*m* protruding rearward from the driving channel 5*b*. The guiding channel 5*m* is a plate-like member that projects obliquely upward toward the rear. The guiding channel 5*m* is made of a single member integrally formed with the driver guide 5*a*. The driver guide 5*a* is coupled to the magazine 18 via the guiding channel 5*m*. The magazine 18 accommodates a plurality of driven members 8. Each driven member 8 is fed one by one from the magazine 18 to the driver guide 5*a* in an orientation extending upward and downward. Each driven member 8 is guided to the driving channel 5*b* via the guiding channel 5*m*.

Figure 2:
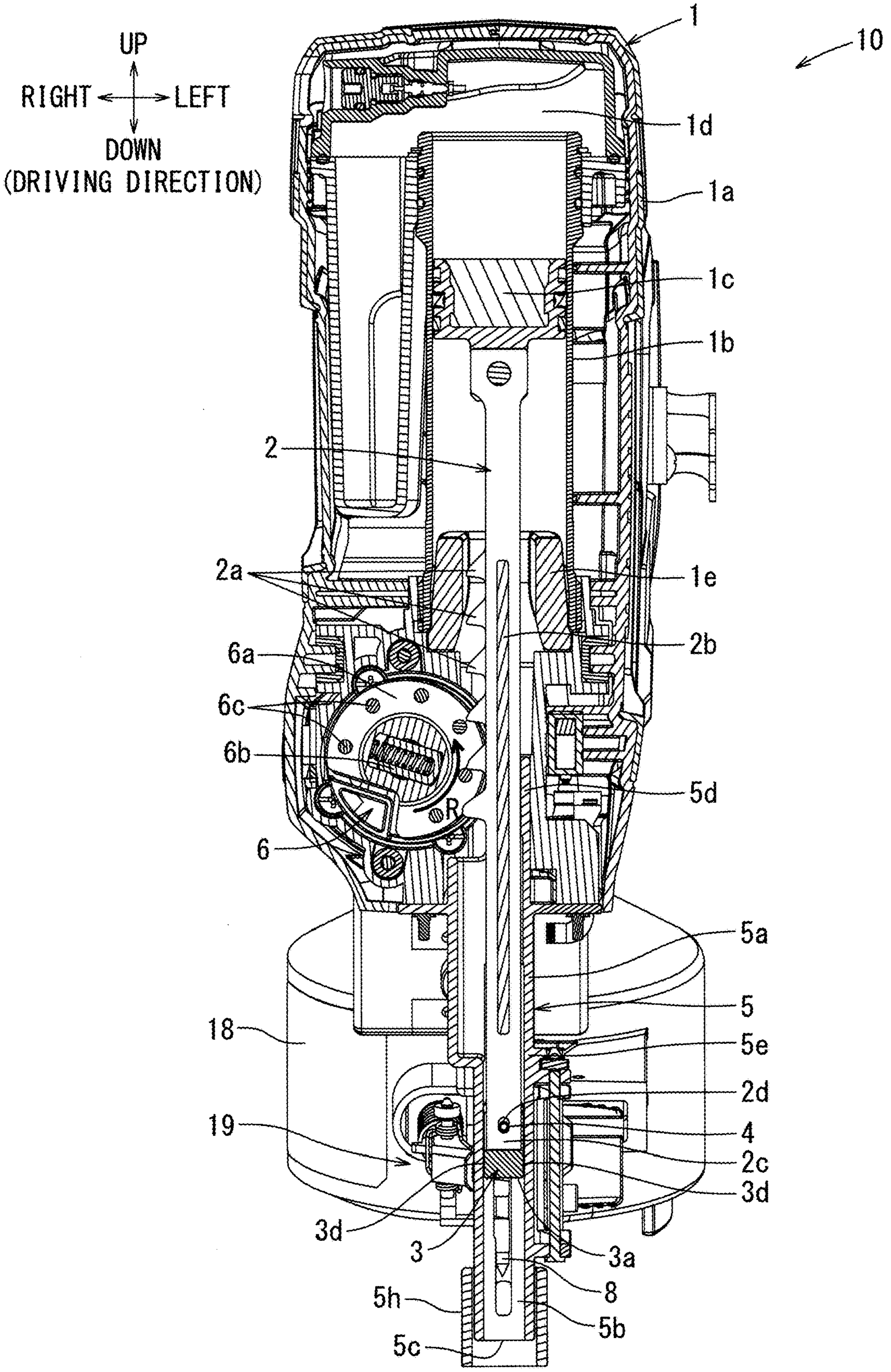
FIG. 2 is a cross-sectional view taken along line II-II of FIG. 1.

As shown in FIG. 2, the cylinder 1*b* slidably holds a piston 1*c*. The piston 1*c* is allowed to move in the up-down direction within the cylinder 1*b*. An upper portion of the cylinder 1*b* above the piston 1*c* is communicated with a pressure accumulation chamber 1*d*. The pressure accumulation chamber 1*d* is filled with compressed gas, such as, for example, air. The gas pressure within the pressure accumulation chamber 1*d* serves as a thrust force to move the piston 1*c* downward. A damper 1*e* is disposed at a lower portion of the cylinder 1*b*. The damper 1*e* receives the piston 1*c* that has moved downward to the downward motion end. The damper 1*e* absorbs the impact of the piston 1*c* at the downward motion end.

As shown in FIG. 2, an upwardly and downwardly elongated driver 2 is coupled to a lower side of the piston 1*c*. The driver 2 moves downward within the driver guide 5*a* as the piston 1*c* moves downward. The driver 2 strikes one driven member 8 fed into the driving channel 5*b*. The struck driven member 8 is ejected from an ejection port 5*c*. The ejected driven member 8 is driven into the workpiece.

As shown in FIG. 1, an upper rear portion of the housing 1*a* is provided with a grip 11 for the user to grasp. The grip is substantially cylindrical in shape. The grip 11 extends rearward. A battery mount 14 is provided at a rear portion of the grip 11. A battery pack 15 may be removably mounted on a rear side of the battery mount 14. The battery pack 15 may be removed from the battery mount 14 and repeatedly recharged for use with a separately prepared charger. The battery pack 15 operates as a power source to supply electric power to a drive unit 7, which will be described later.

As shown in FIG. 1, the battery mount 14 is a box-like member that extends upward and downward. A controller 13 is provided inside the battery mount 14. A substantially cylindrical drive unit case 16 is integrally connected to a lower front portion of the battery mount 14. The front portion of the drive unit case 16 is integrally connected to a lower rear portion of the housing 1*a*. The drive unit 7 is housed inside the drive unit case 16. The drive unit 7 has a motor 7*a* as a drive source and a reduction gear train 7*b* connected to the motor 7*a*.

As shown in FIG. 1, a trigger 12 is provided at a lower front portion of the grip 11 to allow the user to pull to operate with his/her fingertip. When the contact arm 5*h* is moved upward relative to the driver guide 5*a*, a pull operation of the trigger 12 is enabled. A switch 17 is provided above the trigger 12. The pull operation of the trigger 12 causes the switch 17 to be pushed in upward. Thereby, the switch 17 is turned in an ON state. The switch 17 in the ON state transmits a signal to the controller 13. The controller 13 operates a motor 7*a* based on the transmitted signal. A rotational output of the motor 7*a* is decelerated by a reduction gear train 7*b* and outputs to the lifter 6 at the front. A lifter 6 rotates around the same axis as a motor axis 7*c*.

As shown in FIG. 2, the lifter 6 is provided at a lower right side of the cylinder 1*b*. The lifter 6 rotates to return the downwardly moved driver 2 and piston 1*c* upward together. The lifter 6 has a rotary shaft 6*b* connected to the drive unit 7 (FIG. 1) and a wheel 6*a* supported by the rotary shaft 6*b*. The rotary shaft 6*b* rotates in a direction indicated by an arrow R (counterclockwise in FIG. 2). Rotation of the rotary shaft 6*b* causes also the wheel 6*a* to rotate counterclockwise. The wheel 6*a* is restricted to rotate clockwise. The lifter 6 includes a plurality of engaging portions 6*c* provided along an outer peripheral edge of the wheel 6*a*. A cylindrical shaft member is used for each engaging portion 6*c*. Each engaging portion 6*c* extends in the front-rear direction. Six engaging portions 6*c* are provided on the wheel 6*a* in an area corresponding to approximately three-quarters of the circumference. The remaining area corresponding to one quarter of the circumference is referred to as a relief area where the engaging portions 6*c* are not disposed. Each engaging portion 6*c* engages the driver 2.

As shown in FIG. 2, the driver 2 is a plate-like member having a rectangular cross section. The driver 2 has a plurality of engaged portions 2*a* (rack teeth). Each engaged portion 2*a* protrudes from a right side portion of the driver 2 toward right. Each engaged portion 2*a* is formed to have a shape of rack teeth. More specifically, six engaged portions 2*a* are aligned in a longitudinal (up-down) direction of the driver 2. A lower side of each engaged portion 2*a* is oriented to the side of the driving direction (downward). The lower side of each engaged portion 2*a* engages with each engaging portion 6*c* of the lifter 6. Therefore, the driver 2 is supported by the lifter 6 from below. As the lifter 6 rotates in the R direction, the engaging portions 6*c* successively engage the engaged portions 2*a* of the driver 2. As a result, the driver 2 and the piston 1*c* are returned upward. As the piston 1*c* is returned, gas pressure within the pressure accumulation chamber 1*d* is increased. FIG. 2 and FIG. 3 show the driver 2 set in a standby position before performing driving operation.

Figure 4:
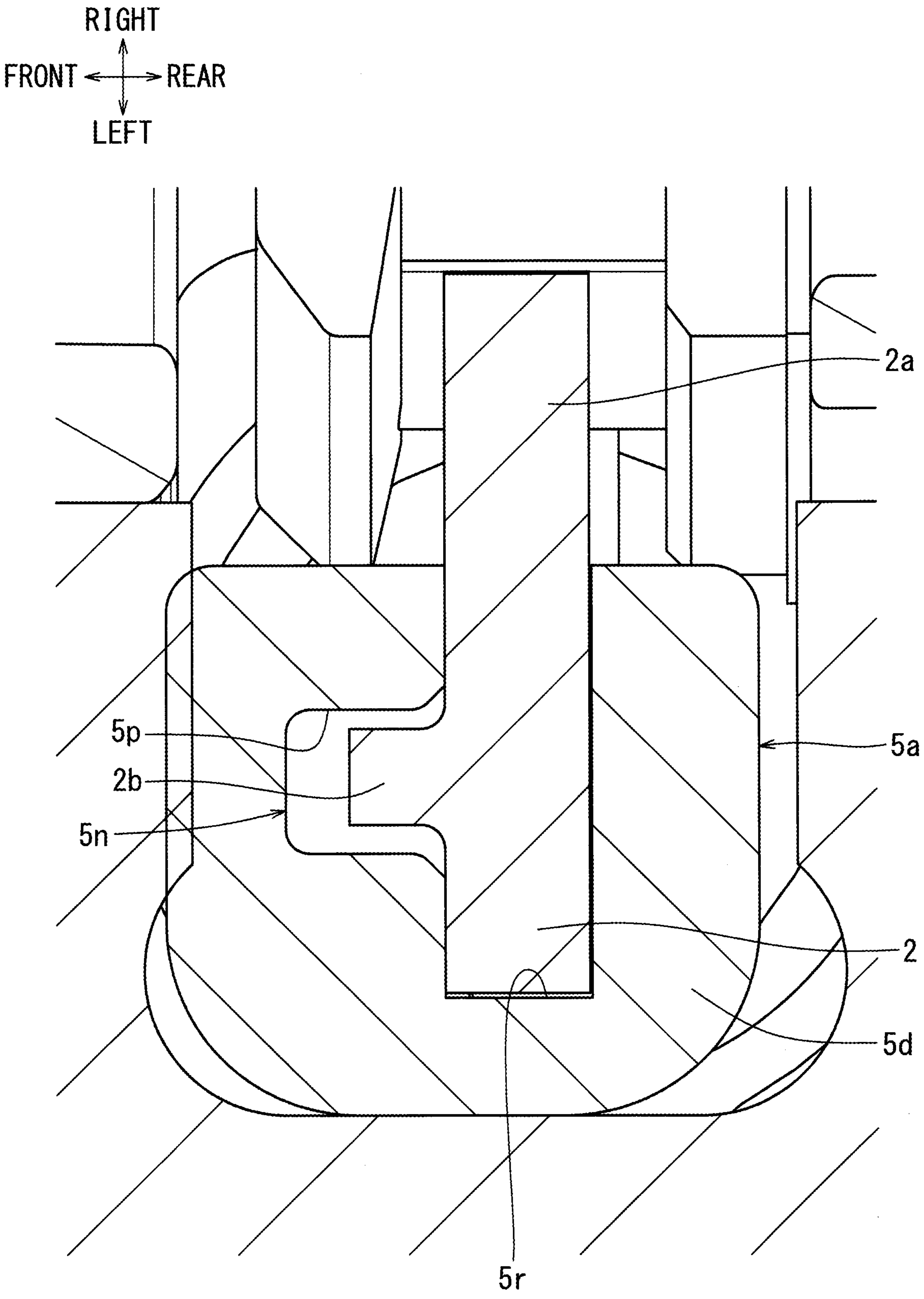
FIG. 4 is a cross-sectional view taken along line IV-IV of FIG. 3.

As shown in FIG. 2 and FIG. 3, the driver 2 has a projection 2*b* elongated in the up-down direction. The projection 2*b* protrudes forward from a front side portion of the driver 2. The projection 2*b* is formed in a center of the driver 2 in the up-down direction. As shown in FIG. 4, inside the driver guide 5*a*, a driver guide portion 5*d* is formed to support the driver 2 from its circumference. The driver guide portion 5*d* forms a substantially rectangular shape in cross section that conforms to the shape of the driver 2. The driver guide portion 5*d* can guide the up/down movement of the driver 2. The driver guide portion 5*d* supports the driver 2 from a left side with its left support section 5*r*. The left support section 5*r* can receive the leftward pressure applied on the driver 2 while the lifter 6 is rotating. The left support section 5*r* may prevent the driver 2 from being distorted in the left direction due to the pressure from the lifter 6. Further, the driver guide portion 5*d* is formed with a recess 5*n* that is recessed to conform to the projection 2*b* of the driver 2. An interference between the driver guide portion 5*d* and the projection 2*b* may be avoided by the recess 5*n*. The right support section 5*p* of the recess 5*n* may support the projection 2*b* from the right side. Thereby, the driver 2 is prevented from slipping out to the right.

As shown in FIG. 2 and FIG. 3, the driver 2 has a striker 3 that is attached to a tip 2*c* of the driver 2. The striker 3 moves upward and downward in the driver guide 5*a* together with the driver 2. The striker 3 strikes the driven member 8 fed in the driving channel 5*b* as the driver 2 moves downward. As shown in FIG. 3, the striker 3 strikes a circular flange-like nail head 8*a* of the driven member 8. The driver guide 5*a* has a tubular striker guide portion 5*e* that supports the circumference of the striker 3. The striker guide portion 5*e* can guide the upward and downward movement of the striker 3. An inner diameter of the striker guide portion 5*e* is larger than that of an inner diameter of the driver guide portion 5*d*.

Figure 5:
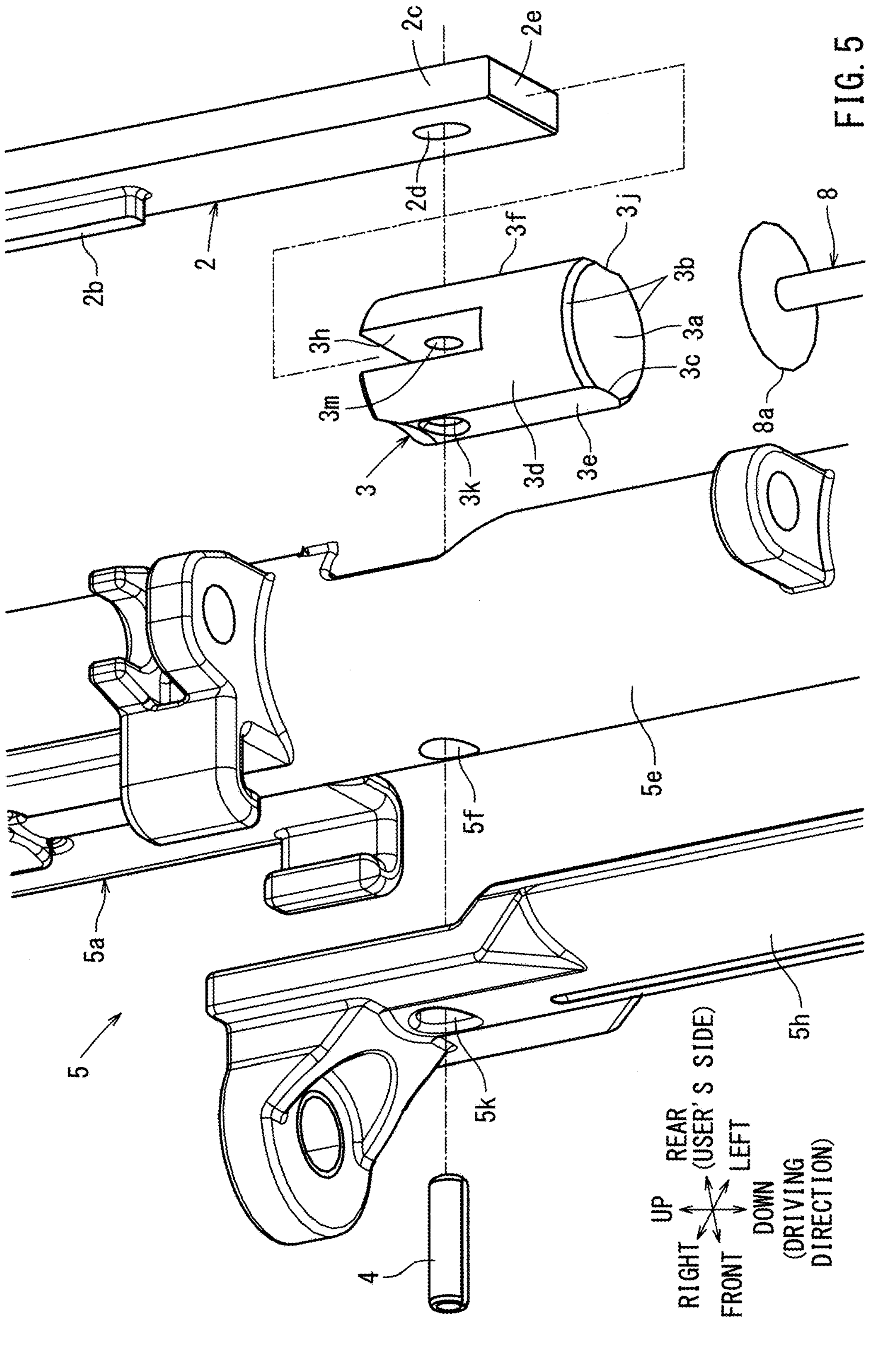
FIG. 5 is an exploded perspective view of the nose and a driver.

As shown in FIG. 5, the striker 3 is a substantially cylindrical metal member. On a lower side of the striker 3, a striking surface 3*a* is formed that contacts the nail head 8*a* while striking. The striking surface 3*a* forms a substantially circular shape that conforms to the shape of the nail head 8*a*. The striking surface 3*a* has a circular arc portion 3*b* that conforms to a peripheral edge of the nail head 8*a*, and a first cutoff edge 3*c* and a second cutoff edge 3*j* formed by partially cutting off the circular arc portion 3*b*. The first cutoff edge 3*c* and the second cutoff edge 3*j* are formed symmetrical with respect to the center of the striking surface 3*a*. The striking surface 3*a* is larger than a distal end face 2*e* of the driver 2, which is rectangular in cross section. Further, the circular arc portion 3*b* allows the striking surface 3*a* to conform to the shape of the nail head 8*a*. Therefore, the striker 3 can strike the nail head 8*a* evenly over a relatively wide area. This allows the striker 3 to strike the driven member 8 efficiently. Furthermore, it is possible to suppress deformation of a part of the nail head 8*a* during striking.

As shown in FIG. 5, each circumferential lateral side of the striker 3 is formed with a first cutoff surface 3*e* and a second cutoff surface 3*f* formed by partially cutting off the guide surface 3*d*. The guide surface 3*d* is supported by the striker guide portion 5*e* (FIG. 2). The first cutoff surface 3*e* faces forward. The second cutoff surface 3*f* faces rearward. The first cutoff surface 3*e* and the second cutoff surface 3*f* are symmetrical with respect to the center axis of the striker 3. Thus, the striker 3 has a shape that is symmetrical in the front-rear direction.

As shown in FIG. 5, the striker 3 has an attachment groove 3*h* recessed downward from its upper side. The attachment groove 3*h* is formed over the entire left-right direction. The attachment groove 3*h* is recessed in a rectangular shape that conforms to the shape of the tip 2*c* of the driver 2. The tip 2*c* of the driver 2 is inserted into the attachment groove 3*h*. The inserted tip 2*c* fits into the attachment groove 3*h*. The striker 3 also has a round hole-shaped first insertion hole 3*k* and a second insertion hole 3*m* that pass through in the front-rear direction. The first insertion hole 3*k* is formed in the first cutoff surface 3*e*. The second insertion hole 3*m* is formed in the second cutoff surface 3*f*. Center axes of the first insertion hole 3*k* and the second insertion holes 3*m* are placed on the same axis as each other. This same axis passes through the attachment groove 3*h*.

As shown in FIG. 5, the tip 2*c* of the driver 2 is formed with a driver insertion hole 2*d* that passes through in the front-rear direction. The driver insertion hole 2*d* is formed as an elongated hole that is elongated in the up-down direction. When the tip 2*c* is inserted into the attachment groove 3*h*, the driver insertion hole 2*d* communicates with the first insertion hole 3*k* and the second insertion hole 3*m*. A pin 4 is press-fitted from front side over these communicated first insertion hole 3*k*, second insertion hole 3*m*, and driver insertion hole 2*d*. As shown in FIG. 3, the striker 3 is thus connected to the tip 2*c* of the driver 2.

As shown in FIG. 3 and FIG. 5, the driver guide 5*a* has a round hole-shaped guide attachment hole 5*f* that passes through in the front-rear direction. An inner diameter of the guide attachment hole 5*f* is slightly larger than an outer diameter of the pin 4. Therefore, the pin 4 can pass through the guide attachment hole 5*f*. The contact arm 5*h* has a round hole-shaped arm attachment hole 5*k* that passes through in the front-rear direction. An inner diameter of the arm attachment hole 5*k* is larger than the outer diameter of the pin 4. Therefore, the pin 4 can pass through the arm attachment hole 5*k*. As shown in FIG. 3, when the contact arm 5*h* is moved down with respect to the driver guide 5*a*, the arm attachment hole 5*k* and the guide attachment hole 5*f* are placed on the same axis. Therefore, with the contact arm 5*h* moved down, the pin 4 can be inserted into the driver guide 5*a* from an outside of the nose 5.

As shown in FIG. 3, the driver 2 that is set in the standby position, enters the driving channel 5*b*. And the driver insertion hole 2*d* is placed on the same axis as the guide attachment hole 5*f* and arm attachment hole 5*k*. The first insertion hole 3*k* and second insertion hole 3*m* of the striker 3 are also placed on the same axis as the guide attachment hole 5*f* and arm attachment hole 5*k*. Therefore, the pin 4 can be inserted through the arm attachment hole 5*k* and the guide attachment hole 5*f* to be press-fitted into the first insertion hole 3*k*, the second insertion hole 3*m* and the driver insertion hole 2*d*. The striker 3 can be thus connected to the driver 2 within the driver guide 5*a*.

As shown in FIG. 3, the guiding channel 5*m* is located on an extension behind the guide attachment hole 5*f*. Therefore, with the driver 2 set in the standby position, the pin 4 can be pushed into from the guide attachment hole 5*f* side to the rear. This allows the pin 4 to be pushed out into the guiding channel 5*m*. As a result, the striker 3 can be removed from the driver 2. Further, the striker 3 in the standby position is also located in the set position (see FIG. 6) of the driven member 8. Therefore, with the driver 2 set in the standby position, the driven member 8 is not fed to the set position. Thus, even if the driver 2 moves down at an unintended timing, the driven member 8 is not struck. This ensures that accidental ejection of the driven member 8 is reliably prevented.

Figure 6:
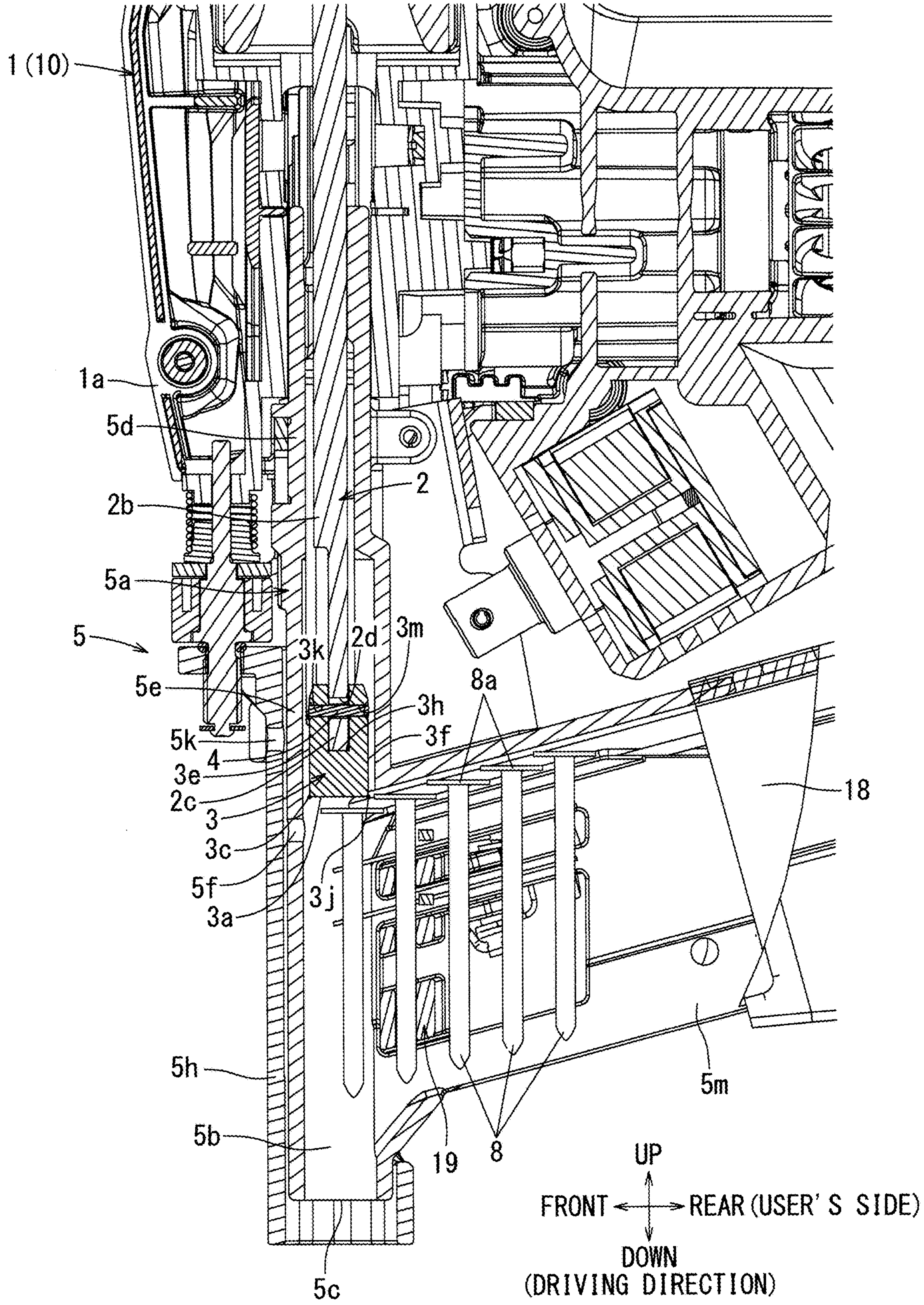
FIG. 6 is a view corresponding to FIG. 3 in a state where the driver has moved to a loading position.

FIG. 6 shows the driver 2 set in a loaded position above the standby position and the driven members 8 set in the set position. In the loaded position, the striker 3 is positioned above the set position of the driven members 8. This allows the driven members 8 to be fed into the driving channel 5*b*. One of the driven members 8 is fed into the driving channel 5*b* by a feed mechanism 19. The second cutoff surface 3*f* and the second cutoff edge 3*j* of the striker 3 are oriented toward the magazine 18 behind. Therefore, the striker 3 is less likely to interfere with the next driven member 8 in line after the driven member 8 set in the driving channel 5*b* when moving down. This allows the striker 3 to move down properly.

As described above, as shown in FIG. 2, the driving tool 10 has a plate-like driver 2 having engaged portions 2*a*. The lifter 6 engages the engaged portions 2*a*. The lifter 6 allows the driver 2 to move. As shown in FIG. 3, the striker 3 is connected to the tip 2*c* of the driver 2. The striker 3 strikes the driven member 8. The area of the striking surface 3*a* of striker 3 is larger than the area of the tip 2*c* of driver 2. Therefore, the striker 3 having a larger area than the tip 2*c* of the driver 2 strikes the driven member 8. Compared to the structure in which the tip 2*c* of the driver 2 strikes the driven member 8, it is easier to strike the driven member 8 in a wider range. It is possible to reduce the increase in weight with the simple structure of connecting the striker 3 to the tip 2*c* of the driver 2.

As shown in FIG. 5, the striker 3 is detachably connected to the driver 2. This allows the striker 3 to be easily replaced.

As shown in FIG. 5, the driven member 8 has a nail head 8*a* that is at least partially a circular arc. The striker 3 has a circular arc portion 3*b*. Therefore, the striker 3 can easily strike the nail head 8*a* of the driven member 8.

As shown in FIG. 3, the driving tool 10 includes a magazine 18 to accommodate the driven members 8. The striking surface 3*a* of the striker 3 has a second cutoff edge 3*j* formed by cutting a portion of a circle. The striker 3 is positioned such that the second cutoff edge 3*j* is oriented to the magazine 18. Typically, the magazine 18 accommodates a plurality of driven members 8 connected in a row. Therefore, with the second cutoff edge 3*j* oriented to the magazine 18, the striker 3 is less likely to interfere with the driven member 8 arranged after the driven member to be struck.

As shown in FIG. 5, an attachment recess 3*h* is formed in the striker 3 into which the tip 2*c* of driver 2 is inserted. Thus, the tip 2*c* of the driver 2 having a relatively small diameter may be assembled into the striker 3 having a relatively large diameter.

As shown in FIG. 3, the driving tool 10 has a pin 4 that is inserted into the driver 2 and the striker 3. Thus, the driver 2 and the striker 3 may be connected to each other with a simple structure by inserting the pin 4.

As shown in FIG. 3, the driving tool 10 has a tubular driver guide 5*a* to guide the movement of the driver 2. The driver guide 5*a* is formed with an outwardly opening guide attachment hole 5*f*. The guide attachment hole 5*f* allows the pin 4 to be inserted into the driver 2 and the striker 3. This allows the driver 2 and the striker 3 to be connected to each other with the driver 2 and the striker 3 disposed within the driver guide 5*a*.

As shown in FIG. 3, the driving tool 10 has a magazine 18. The magazine 18 accommodates the driven members 8 to be supplied to the driver guide 5*a*. The guiding channel

5*m* guides the driven members 8 from the magazine 18 to the driving channel 5*b*. The guiding channel 5*m* is located on an extension of the guide attachment hole 5*f*. Therefore, the pin 4 inserted through the guide attachment hole 5*f* can be pushed toward the guiding channel 5*m*. This allows for easy disconnection between the driver 2 and the striker 3.

As shown in FIG. 3, the driver guide 5*a* includes a driver guide portion 5*d* to guide the movement of the driver 2 and a striker guide portion 5*e* to guide the movement of the striker 3. Therefore, the driver guide 5*a* can guide the movement of the striker 3. This prevents misalignment of the striker 3 when striking the driven member 8. As a result, the striker 3 can strike the driven member 8 properly.

As shown in FIG. 2, the driver 2 is stopped and held in the standby position by the lifter 6. As shown in FIG. 3, the guide attachment hole 5*f* is located to allow the pin 4 to be inserted into the driver 2 when the driver 2 is in the standby position. Accordingly, the pin 4 may be attached and removed with the driver 2 held in the standby position.

As shown in FIG. 2, the driving tool 10 includes a piston 1*c* connected to the driver 2 and a cylinder 1*b* to generate gas pressure with the piston 1*c*. Therefore, the driver 2 can strike the driven member 8 using the gas pressure.

Various modifications may be made to the embodiments described above. For example, the driving tool 10 has been exemplary described as a gas-spring type driving tool that utilizes gas pressure. Instead, a mechanical spring type driving tool that utilizes spring force may also be adopted.

The attachment recess of the striker may be a cylindrical or rectangular recess alternative to the cutoff groove. A structure of the striker has been described as an example in which the end of the driver is inserted into the cutoff groove and connected by the pin. Alternatively, a male thread on one side may be threadably fitted to a female thread on the other side. The end of the driver may be press-fitted into the striker. The striker may be inserted into a recess formed in the driver and joined via a pin. The driver and the striker may be connected by any other method, such as a claw fitting or adhesion.

The striker may have a disc-shape instead of a cylindrical shape. The striking surface of the striker may be circular without a cutoff edge. The striking surface may be rectangular instead of circular. The striking surface may have a shape that does not conform to the head of the driven member as long as the striking surface is configured to strike the driven member in a wider range than the end of the driver. The striker does not have to be cylindrical; for example, it may have a configuration where the outer diameter varies along the extending direction, such as a truncated cone. In that case, it is desirable for the striking surface to have the largest possible width diameter. The cutoff edge of the striker may be configured to be provided at only one location oriented toward the magazine.

The head of the driven member may be configured to have a cutoff edge. In this case, it is desirable for the cutoff edge of the striker to be disposed along the cutoff edge of the driven member.

What is claimed is:

1. A driving tool comprising:

a plate-like driver having a plurality of engaged portions;

a lifter configured to engage the plurality of engaged portions for moving the driver; and a striker connected to an end of the driver to strike driven members, wherein an area of a striking surface of the striker is larger than an area of the end of the driver, wherein the striker moves in a striking direction to strike the driven members, and wherein the striker is located downstream of the driver in the striking direction.

2. The driving tool according to claim 1, wherein the striker is detachably connected to the driver.

3. The driving tool according to claim 1, wherein each driven member has a head that is at least partially a circular arc, and wherein the striker has a circular arc portion.

4. The driving tool according to claim 1, wherein the striking surface of the striker has a cutoff edge formed by cutting a portion of a circle, and wherein the striker is positioned such that the cutoff edge is oriented toward a magazine configured to accommodate the driven members.

5. The driving tool according to claim 1, wherein an attachment recess is formed in the striker into which the end of the driver is inserted.

6. The driving tool according to claim 1, further comprising a pin that is inserted into the driver and the striker.

7. The driving tool according to claim 6, further comprising a tubular driver guide configured to guide a movement of the driver, wherein the driver guide is formed with an outwardly opening attachment hole to allow the pin to be inserted into the driver and the striker.

8. The driving tool according to claim 7, further comprising: a magazine configured to accommodate driven members to be supplied to the driver guide; and a guiding channel configured to guide the driven members from the magazine to a driving channel of the driver guide, wherein the guiding channel is located on an extension of the attachment hole.

9. The driving tool according to claim 7, wherein the tubular driver guide includes a driver guide portion configured to guide the movement of the driver, and a striker guide portion configured to guide a movement of the striker.

10. The driving tool according to claim 7, wherein the driver is stopped and held in a standby position by the lifter, and wherein the attachment hole is located to allow the pin to be inserted into the driver when the driver is in the standby position.

11. The driving tool according to claim 1, further comprising comprising: a piston connected to the driver, and a cylinder to generate gas pressure with the piston.

12. The driving tool according to claim 1, wherein each of the plurality of engaged portions has a shape of a rack teeth.

13. A driving tool comprising:

a driver having a plurality of engaged portions;

a driver guide configured to guide the driver;

a lifter configured to engage the plurality of engaged portions for moving the driver;

a striker being moved along a longitudinal direction of the driver guide to strike driven members; and a fastener configured to attach the striker to the driver, wherein the striker moves in a striking direction to strike the driven members, and wherein the striker is located downstream of the driver in the striking direction.

14. The driving tool according to claim 13, wherein each of the plurality of engaged portions protrudes from a side portion of the driver toward the lifter, and wherein each of the plurality of engaged portions has a shape of a rack teeth.

15. The driving tool according to claim 13, wherein the driver guide has a driving channel and a guiding channel, and wherein the guiding channel protrudes rearward from the driving channel.

16. The driving tool according to claim 15, wherein the guiding channel is a plate-like member that projects obliquely upward toward a rear of the driving tool.

17. The driving tool according to claim 13, wherein the fastener attaches the striker to the driver by being inserted through a guide attachment hole positioned on the driver guide.

18. The driving tool according to claim 15 further comprising a magazine, wherein the driver guide is coupled to the magazine via the guiding channel.

19. The driving tool according to claim 13, wherein the driver guide further comprises a driver guide portion for guiding the driver and a striker guide portion for guiding the striker.

20. The driving tool according to claim 13, wherein the fastener is selected from a group consisting of a pivot pin, a claw fitting, and an adhesive.

* * * * *